(12) United States Patent
Sekiguchi

(10) Patent No.: US 12,572,423 B2
(45) Date of Patent: Mar. 10, 2026

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Shiho Sekiguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 464 days.

(21) Appl. No.: 18/334,003

(22) Filed: Jun. 13, 2023

(65) Prior Publication Data

US 2023/0409429 A1      Dec. 21, 2023

(30) Foreign Application Priority Data

Jun. 20, 2022      (JP) ................................. 2022-098737

(51) Int. Cl.
*G06F 9/4401* (2018.01)
*G06F 8/65* (2018.01)
*G06F 11/14* (2006.01)

(52) U.S. Cl.
CPC ............ *G06F 11/1433* (2013.01); *G06F 8/65* (2013.01); *G06F 9/4413* (2013.01)

(58) Field of Classification Search
CPC ...... G06F 11/1433; G06F 8/65; G06F 9/4413; G06F 8/61; G06F 9/451
See application file for complete search history.

(56) References Cited

U.S. PATENT DOCUMENTS

| | | | |
|---|---|---|---|
| 2016/0239285 A1* | 8/2016 | Jana ........................... | G06F 8/61 |
| 2017/0024202 A1* | 1/2017 | Tokuda .................... | G06F 8/65 |
| 2021/0096795 A1* | 4/2021 | Chew .................... | G06F 3/1204 |

FOREIGN PATENT DOCUMENTS

JP      2018-194910 A      12/2018

* cited by examiner

*Primary Examiner* — Sisley N Kim
(74) *Attorney, Agent, or Firm* — VENABLE LLP

(57) ABSTRACT

To provide an information processing apparatus, a control method, and a computer-readable storage medium capable of suppressing a decrease in user convenience, processing is executed while confirming whether PnP is being executed based on the premise that there is an OS in which PnP may occur multiple times. This makes it possible to update and install the driver appropriately and prevent a user from mistakenly trying to use the device during the installation.

17 Claims, 10 Drawing Sheets

700

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a computer-readable storage medium.

Description of the Related Art

Japanese Patent Laid-Open No. 2018-194910 discloses a technique of generating a print queue of an outbox driver while deleting a print queue of a general driver (inbox driver) provided by an operating system (OS) which has been generated in association with a device.

In the case of updating the inbox driver to the outbox driver by a setup program, plug and play (PnP) may occur multiple times in the operating system (OS). The number of times and interval of occurrence of PnP depend on a time required for processing in the OS and a search by the Windows Update (WU) and therefore cannot be grasped by the setup program. Thus, in a case where the OS performs a background update of a driver or the like, the setup program may determine that an appropriate driver is not applied and mistakenly determine that the setup has failed. However, a user cannot know the update status of the driver. Accordingly, even if a user thinks that the installation has been completed and tries to start using the device, the user cannot use the device because the OS is updating the driver. As stated above, there is a problem that an operation desired by a user cannot be performed and convenience decreases.

SUMMARY OF THE INVENTION

Therefore, the present invention provides an information processing apparatus, a control method, and a computer-readable storage medium capable of suppressing a decrease in user convenience.

Accordingly, a non-transitory computer-readable storage medium stores a program to cause a computer to execute a control method in a computer including an operating system (OS) having a function of applying a first driver corresponding to a target device on the basis that the target device is connected, the control method comprising:

determining whether the OS is executing a process to apply the first driver corresponding to the target device on the basis that the target device is connected;

in a case where it is determined that execution of the process has been completed, determining whether a second driver different from the first driver is applied to the computer;

determining that driver application has succeeded in the computer based on determination that the second driver is applied; and in a case where it is determined that the second driver is not applied, re-executing the step of determining whether the process to apply the first driver is being executed.

According to the present invention, an information processing apparatus, a control method, and a computer-readable storage medium capable of suppressing a decrease in user convenience can be provided.

Further features of the present invention will become apparent from the following description of exemplary embodiments with reference to the attached drawings.

DESCRIPTION OF THE EMBODIMENTS

Embodiments of the present invention will be described below with reference to the drawings.

Figure 1:
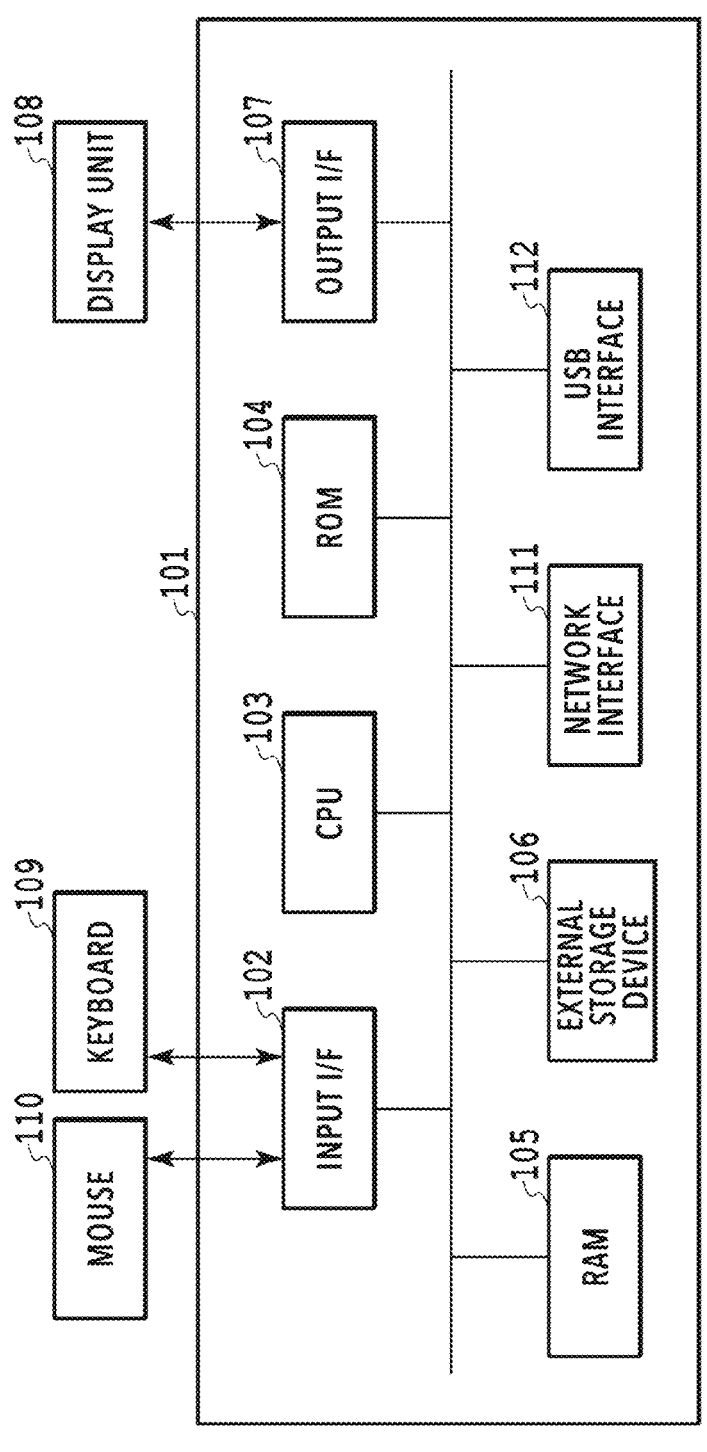
FIG. 1 is a block diagram showing a hardware configuration of an information processing apparatus.

FIG. 1 is a block diagram showing a hardware configuration of an information processing apparatus 101 in the present embodiment. The information processing apparatus 101 comprises an input interface (I/F) 102, a CPU 103, a ROM 104, a RAM 105, an external storage device 106, and an output interface (I/F) 107 and is connected to a display unit 108, a keyboard 109, a mouse 110, and the like. The information processing apparatus 101 further comprises a network interface (first communication unit) 111 and a USB interface (second communication unit) 112.

The input interface (I/F) 102 is an interface for accepting data inputs and operation instructions from a user operating the mouse 110 or the keyboard 109. The CPU 103 is a system control unit and is a processor which controls the entire information processing apparatus 101. The ROM 104 stores fixed data such as a control program executed by the CPU 103, a data table, and a preinstalled operating system (hereinafter referred to as OS) program. In the present embodiment, each control program stored in the ROM 104 performs software execution control such as scheduling, task switching, and interruption processing under the management of the preinstalled OS stored in the ROM 104.

The RAM 105 is formed by a static random access memory (SRAM) requiring a backup power source or the like. Incidentally, the RAM 105 holds data by the use of an unshown primary battery for data backup and can store important data such as program control variables without volatilizing them. In the RAM 105 is also provided a memory area to store setting information of the information processing apparatus 101, management data of the information processing apparatus 101, and the like. The RAM 105 is also used as a main memory and work memory of the CPU 103.

The external storage device 106 stores an application which provides a print execution function, a print job generating program which generates a print job interpretable by a communication apparatus 201, and the like. The external storage device 106 also stores various programs such as an information transmission/reception control program for transmission to/reception from the communication apparatus 201 connected via the network interface 111 or the USB interface 112 and various types of information used by these programs. Incidentally, a program for setup (hereinafter referred to as a setup program) to be described later is also stored in the external storage device 106. In the present embodiment, the setup program installs a driver suitable for the communication apparatus 201 in the information processing apparatus 101. Incidentally, in the present embodiment, the communication apparatus 201 to be a target of driver installation is defined as a target device.

The output interface (I/F) 107 is an interface which performs control in order for the display unit 108 to display data and notify the status of the information processing apparatus 101. The display unit 108 is formed by a light-emitting diode (LED), a liquid-crystal display (LCD), and the like and configured to display data and notify the status of the information processing apparatus 101. Incidentally, the display unit 108 may be provided with a console unit such as a numerical value input key, mode setting key, enter key, cancel key, and power source key to accept an input from a user via the display unit 108.

The network interface 111 controls communication via a wireless LAN and communication processing via a wired LAN cable. More specifically, the network interface 111 is a feature for connecting with the communication apparatus 201 or an external apparatus outside the information processing apparatus 101 and outside the communication apparatus 201 via a wireless LAN or a wired LAN to execute data communication. The USB interface 112 controls USB connection via a USB cable. More specifically, the USB interface 112 is a feature for connecting with the communication apparatus 201 via a USB cable to execute data communication.

Figure 2:
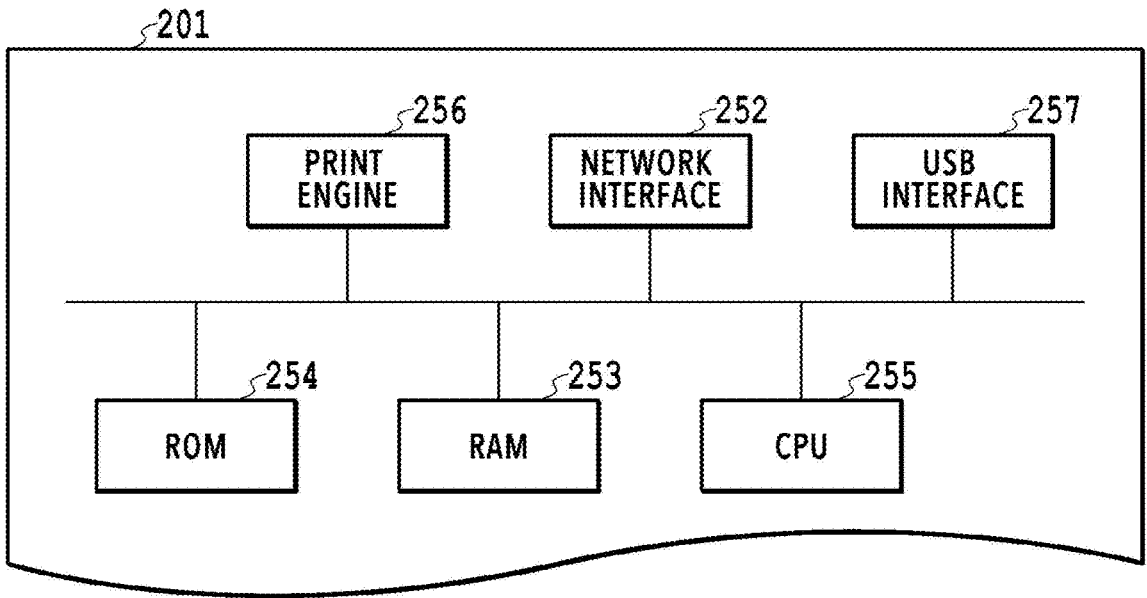
FIG. 2 is a diagram showing a hardware configuration of a communication apparatus.

FIG. 2 is a diagram showing a hardware configuration diagram of the communication apparatus 201. In the present embodiment, the communication apparatus 201 comprises a network interface (I/F) (communication unit) 252, a RAM 253, a print engine 256, a ROM 254, a CPU 255, a USB interface 257, and the like. A computer of the communication apparatus 201 is formed by the CPU 255, RAM 253, and ROM 254. The network interface 252 controls wireless communication and communication processing via a wired LAN cable.

The RAM 253 is formed by a SRAM requiring a backup power source or the like. Incidentally, the RAM 253 holds data by the use of an unshown primary battery for data backup and therefore can store important data such as program control variables without volatilizing them. In the RAM 253 is also provided a memory area to store setting information of the communication apparatus 201, management data of the communication apparatus 201, and the like. The RAM 253 is also used as a main memory and work memory of the CPU 255 and stores a receive buffer and various types of information for temporarily storing print information received from the information processing apparatus 101.

The ROM 254 stores fixed data such as a control program executed by the CPU 255, a data table, and an OS program. In the present embodiment, each control program stored in the ROM 254 performs software execution control such as scheduling, task switching, and interruption processing under the management of the preinstalled OS stored in the ROM 254. The CPU 255 is a system control unit and is a processor which controls the entire communication apparatus 201.

The print engine 256 executes image forming processing of adding a printing material such as ink onto a print medium such as paper based on information stored in the RAM 253 and a print job received from the information processing apparatus 101 and the like and thereby forming an image on a print medium, and outputs the result of printing. Incidentally, a print job is a job to cause the communication apparatus 201 to execute the image forming processing.

Figure 3:
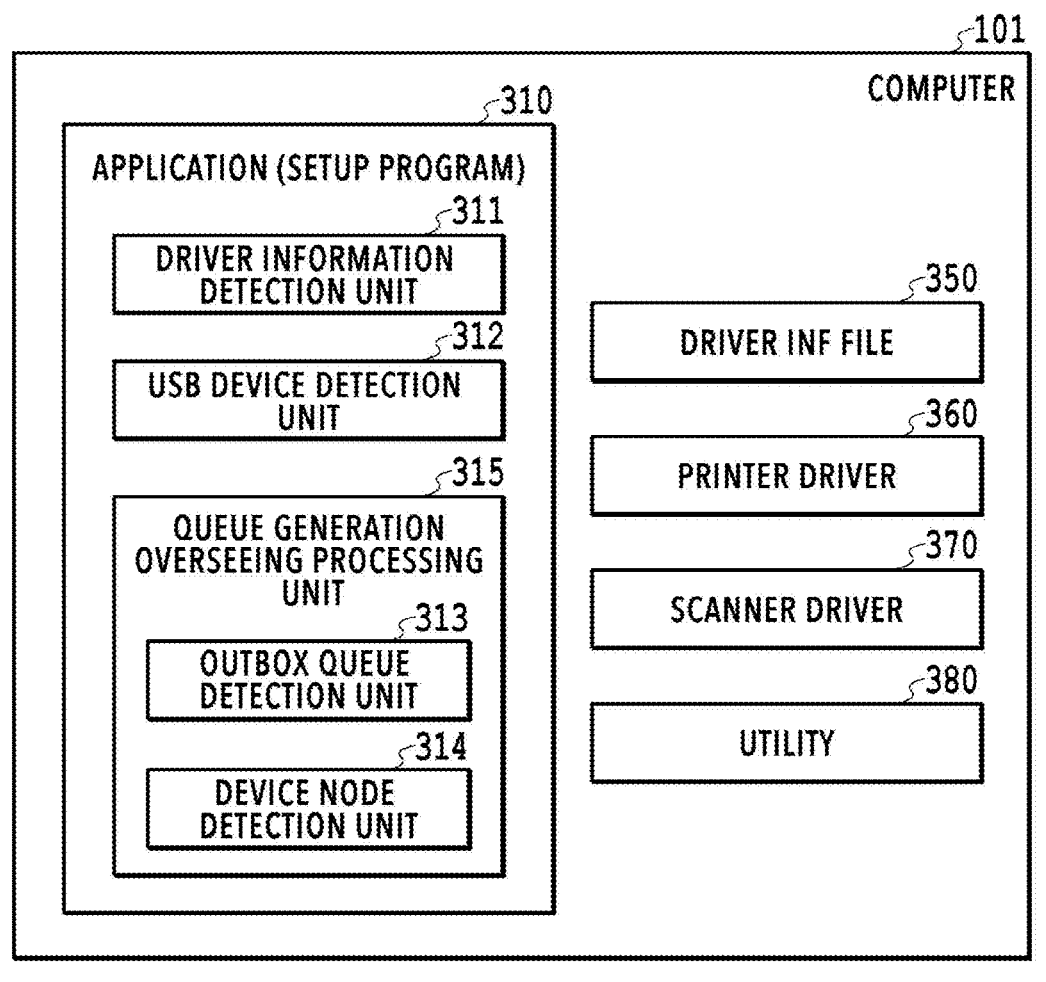
FIG. 3 is a block diagram showing a software functional configuration of the information processing apparatus.

FIG. 3 is a block diagram showing a software functional configuration of the information processing apparatus 101 in the present embodiment. The function of each block shown in FIG. 3 is realized by the CPU 103 loading a program code of the setup program 310 into the RAM 105 and executing the program code. The setup program 310 detects the communication apparatus 201 connected by the USB cable and determines that the detected communication apparatus 201 is a target device. The setup program 310 installs a driver associated with the target device in the information processing apparatus 101.

In a case where the target device is a printer, the setup program 310 installs a printer driver 360 in the information processing apparatus 101. In a case where the target device is a scanner, the setup program 310 installs a scanner driver 370 in the information processing apparatus 101. The setup program 310 also installs a utility 380 in the information processing apparatus 101 as appropriate according to the type of the target device.

The setup program 310 comprises a driver information detection unit 311, a USB device detection unit 312, and a queue generation overseeing processing unit 315. The driver information detection unit 311 obtains driver information of a target device from a driver INF file 350. The driver information includes a driver name. The USB device detection unit 312 detects the communication apparatus 201 connected to the information processing apparatus 101 by the USB cable. The setup program 310 determines that the communication apparatus 201 detected by the USB device detection unit 312 is a target device.

In a case where a plurality of communication apparatuses 201 are detected by the USB device detection unit 312, the setup program 310 determines that a communication apparatus 201 detected first is a target device. As another embodiment, the setup program 310 may display on the display unit 108 a device name and a serial number as information regarding the detected communication apparatuses 201 and prompt a user to select a target device. The information displayed on the display unit 108 by the setup program 310 may be any other identification information usable for identifying the communication apparatuses 201. The queue generation overseeing processing unit 315 comprises an outbox queue detection unit 313 and a device node detection unit 314.

The outbox queue detection unit 313 obtains a list of print queues that have been installed in the information processing apparatus 101. Further, the outbox queue detection unit 313 determines, for each of the extracted print queues, whether a type of a driver associated with the print queue is an outbox driver. The device node detection unit 314 obtains a list of device classes to which a target device is to be allocated and determines whether the target device has been allocated. For example, in a case where the target device is a printer, the device node detection unit 314 obtains a device class of a printer. In a case where information on any of devices allocated to the printer class matches a device descriptor obtained from the target device, the device node detection unit 314 determines that the target device has been allocated.

In the case of installing a device by means of a general setup program, an operation procedure of installing an outbox driver before generating plug and play (PnP) of a USB device is considered. This procedure will be hereinafter referred to as a post-insertion flow. In the post-insertion flow, the Windows OS completes device installation by the use of not an inbox driver but a preinstalled outbox driver. That is, the setup program is capable of installation with the outbox driver applied thereto without spending time for processing of replacing the inbox driver with the outbox driver by the Windows Update (WU).

However, depending the version of the Windows OS, there is a case where the general driver is applied and then updated to the outbox driver. For example, the Windows 11 provides a device having the Internet Printing Protocol (IPP) function with an IPP class driver. The IPP class driver is a general driver for a print function using the IPP over USB standard. Incidentally, in the Windows 11, the IPP class driver is a driver preinstalled in the OS, namely a kind of inbox driver.

In the Windows 11, the processing of replacing the inbox driver with the outbox driver by the WU occurs also in the post-insertion flow. At this time, in the OS, plug and play (PnP) occurring during the execution of the IPP class driver allocation process is treated as being different from PnP occurring during the execution of the process of replacing with the outbox driver. That is, the OS is treated as one in which PnP occurs multiple times.

While PnP occurs multiple times and the PnP is not completed, since the device is not usable, a user cannot start using the device. By the setup program notifying a user that the PnP has been all completed, the user can appropriately grasp a time to start using the device and can start using the device. However, since the number of times and interval of occurrence of PnP depend on a time required for processing in the OS and a search by the WU, a general setup program cannot grasp whether the PnP has been completed.

Therefore, in the present embodiment, in the OS where PnP occurs multiple times, a driver is appropriately updated and installed by the setup program, thereby correctly perceiving that the device is usable and notifying a user of that. The setup program of the present embodiment will be described below in detail.

Figure 4:
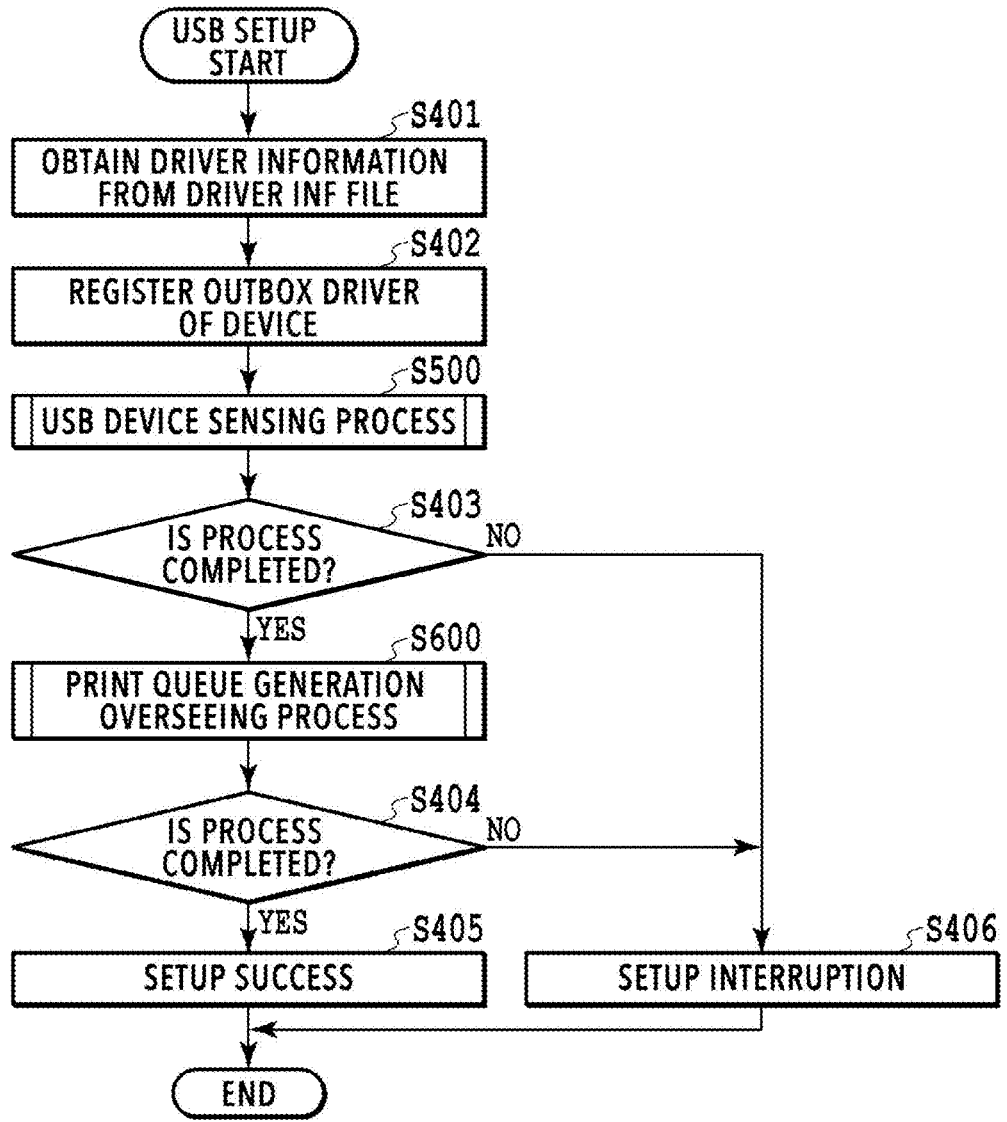
FIG. 4 is a flowchart showing a USB setup process.

FIG. 4 is a flowchart showing a USB setup process of the setup program 310 in the present embodiment. FIG. 7 to FIG. 10 are diagrams showing screens displayed on the display unit 108 in the USB setup process. The USB setup process in the present embodiment will be described below with reference to the flowchart of FIG. 4. Incidentally, the process of the flowchart shown in FIG. 4 is executed by the CPU 103 loading a program code of the setup program 310 into the RAM 105 and executing the program code. Alternatively, some or all of the functions of the steps in FIG. 4 may be realized by hardware such as an ASIC or electronic circuit. Incidentally, the sign "S" in the description of each process means a step in the flowchart.

If the USB setup process is started, in S401, by the action of the CPU 103, the setup program 310 calls the driver information detection unit 311 from the driver INF file 350 and obtains driver information. After that, in S402, by the action of the CPU 103, the setup program 310 registers an outbox driver of the device in the information processing apparatus 101 based on the driver information obtained in S401. That is, in the present embodiment, a post-insertion flow is carried out. In S500, by the action of the CPU 103, the setup program 310 calls the USB device detection unit 312 and detects a device USB-connected to the information processing apparatus 101. If S500 is started, the setup program 310 displays on the display unit 108 a connection instruction screen 700 shown in FIG. 7 to instruct connection of the USB device. The USB device sensing process in S500 will be described later in detail.

After that, in S403 by the action of the CPU 103, the setup program 310 determines whether the process from the USB device detection unit 312 has been completed. If a notification of process completion is received, the setup program 310 determines that the answer is YES and the process transitions to S600. If the setup program 310 senses a press on a button 701 displayed on the connection instruction screen 700, the setup program 310 notifies the USB device detection unit 312 of interruption of the process. After that, if the setup program 310 receives a notification of process interruption from the USB device detection unit 312, the setup program 310 determines in S403 that the answer is NO and the process transitions to S406.

If S600 is started, the setup program 310 disables the showing of the connection instruction screen 700. The setup program 310 then displays on the display unit 108 an in-process screen 800 shown in FIG. 8 to notify that completion of generation of a print que is waited for, calls the queue generation overseeing processing unit 315, and waits for the completion of generation of a print queue. The print queue generation overseeing process in S600 will be described later in detail.

After that, in S404 by the action of the CPU 103, the setup program 310 determines whether the queue generation overseeing process has been completed. If a notification of process completion is received from the queue generation overseeing processing unit 315, the setup program 310 determines that the answer is YES and the process transitions to S405 If the setup program 310 senses a press on a button 801 displayed on the in-process screen 800, the setup program 310 notifies the queue generation overseeing processing unit 315 of interruption of the process. After that, if the setup program 310 receives a notification of process interruption from the queue generation overseeing processing unit 315, the setup program 310 determines in S404 that the answer is NO and the process transitions to S406.

Figure 9:
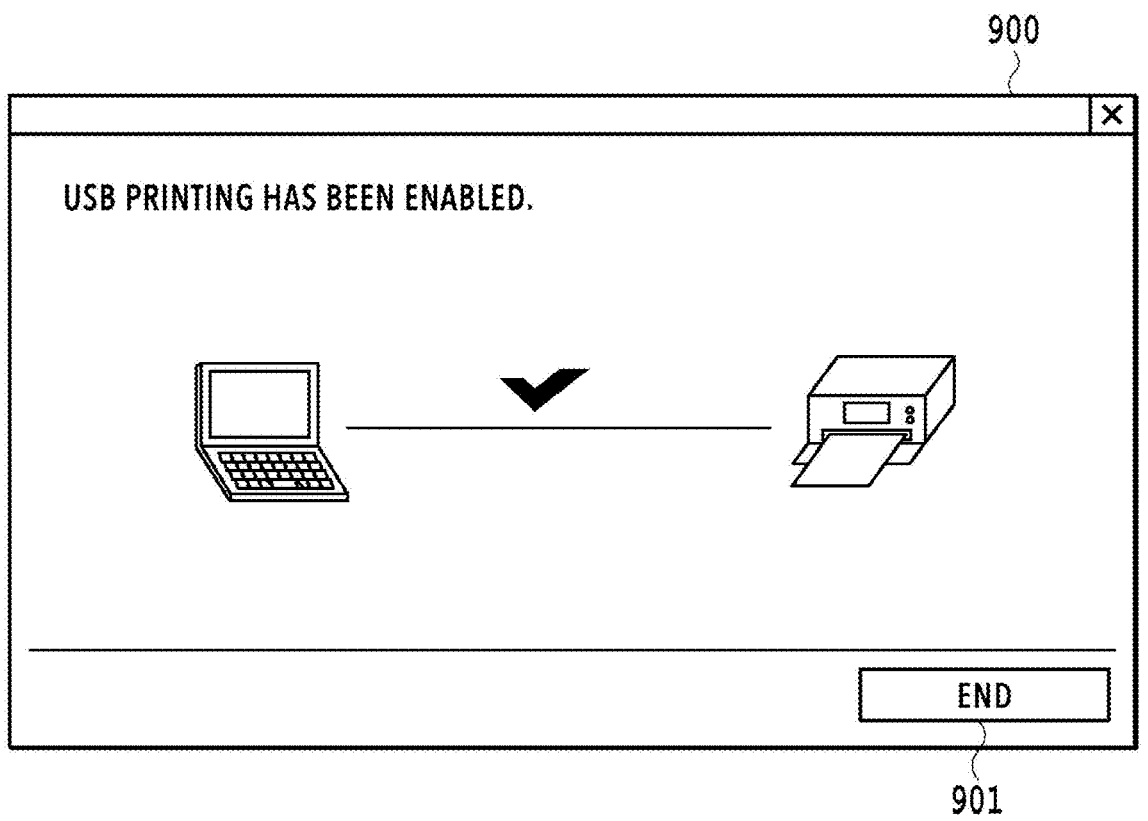
FIG. 9 is a diagram showing a screen displayed on a display unit in the USB setup process.
Figure 10:
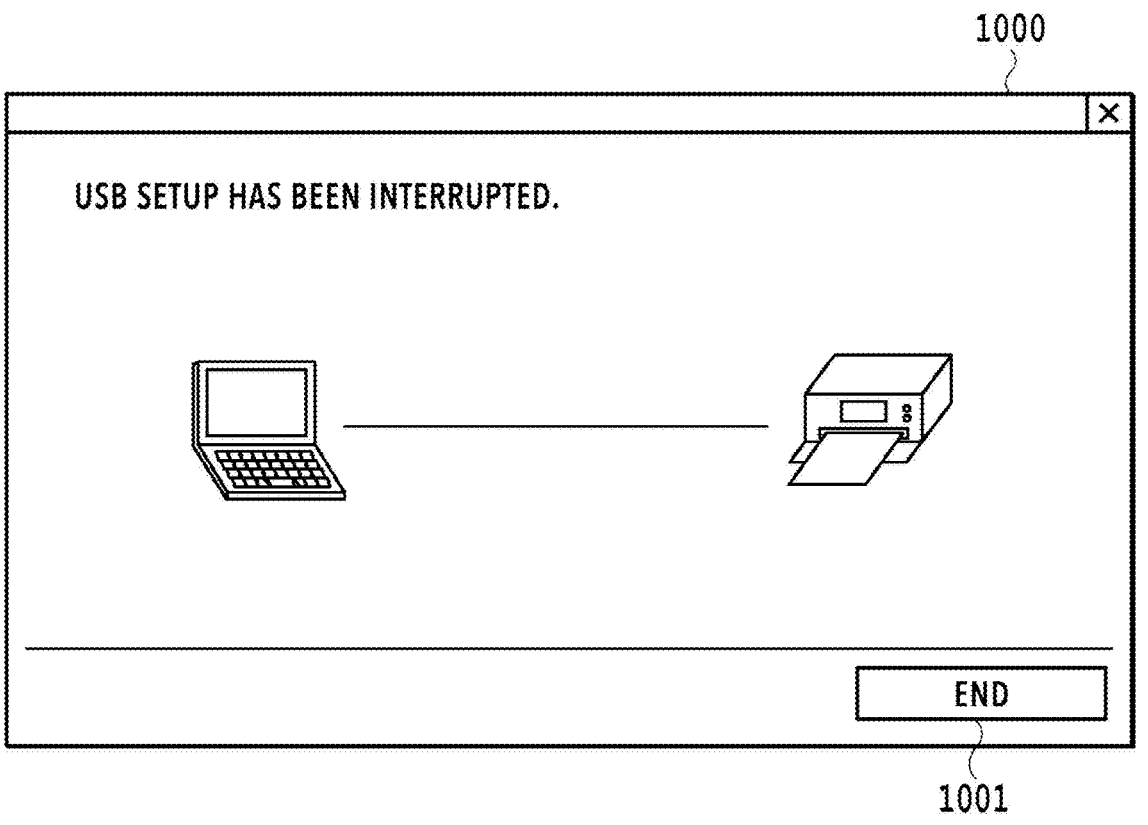
FIG. 10 is a diagram showing a screen displayed on a display unit in the USB setup process.

In S405 by the action of the CPU 103, the setup program 310 disables the showing of the in-process screen 800 and displays on the display unit 108 a success screen 900 shown in FIG. 9 to notify that the USB device has been set up successfully. If the setup program 310 senses a press on a button 901 displayed on the success screen 900, the screen display of the setup program 310 is finished and the USB setup process is finished.

If the process transitions from S403 or S404 to S406 by the action of the CPU 103, the setup program 310 disables the showing of the connection instruction screen 700 or the in-process screen 800. The setup program 310 then displays on the display unit 108 an interruption screen 1000 shown in FIG. 10 to notify that the setup of the USB device has been interrupted. If the setup program 310 senses a press on a button 1001 displayed on the interruption screen 1000, the screen display of the setup program 310 is finished. If the setup program 310 finishes the screen display, the USB setup process is finished.

Figure 5:
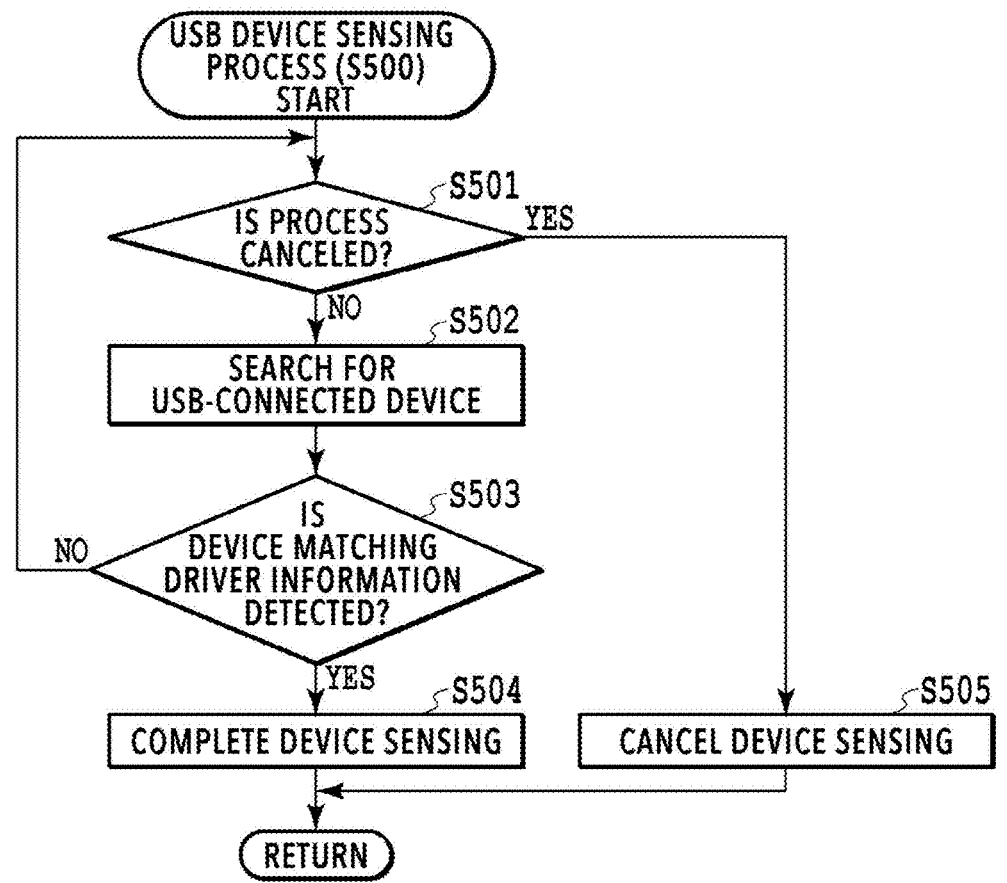
FIG. 5 is a flowchart showing a USB device detection process.

FIG. 5 is a flowchart showing the USB device detection process carried out in S500 of FIG. 4. The USB device detection process in the present embodiment will be described below with reference to the flowchart of FIG. 5.

Incidentally, the process of the flowchart shown in FIG. 5 is executed by the CPU 103 loading a program code of the setup program 310 into the RAM 105 and executing the program code. Alternatively, some or all of the functions of the steps in FIG. 5 may be realized by hardware such as an ASIC or electronic circuit. Incidentally, the sign "S" in the description of each process means a step in the flowchart.

If the USB device detection process is started, in S501, by the action of the CPU 103, the USB device detection unit 312 senses whether a notification to instruct cancellation of this process is made. The cancellation notification is given to the USB device detection unit 312 in a case where the setup program 310 senses a press on the button 701 displayed on the connection instruction screen 700. If there is a cancellation notification, the USB device detection unit 312 determines in S501 that the answer is YES and the process transitions to S505. In S505, the USB device detection unit 312 notifies the setup program 310, which is a caller, that the device sensing has been canceled. After that, the USB device detection process is finished.

If there is no cancellation notification in S501, the USB device detection unit 312 determines that the answer is NO and the process proceeds to S502. By the action of the CPU 103, in S502, the USB device detection unit 312 tries to detect the communication apparatus 201 USB-connected to the information processing apparatus 101. By the action of CPU 103, in S503, the USB device detection unit 312 determines that the answer is NO and the process returns to S501 if a device matching the driver information obtained in S401 cannot be detected. The USB device detection unit 312 determines that the answer is YES and the process transitions to S504 if a device matching the driver information obtained in S401 is detected. In S504, by the action of the CPU 103, the USB device detection unit 312 notifies the setup program 310, which is a caller, that the device sensing has been completed. After that, the USB device detection process is finished.

Figure 6:
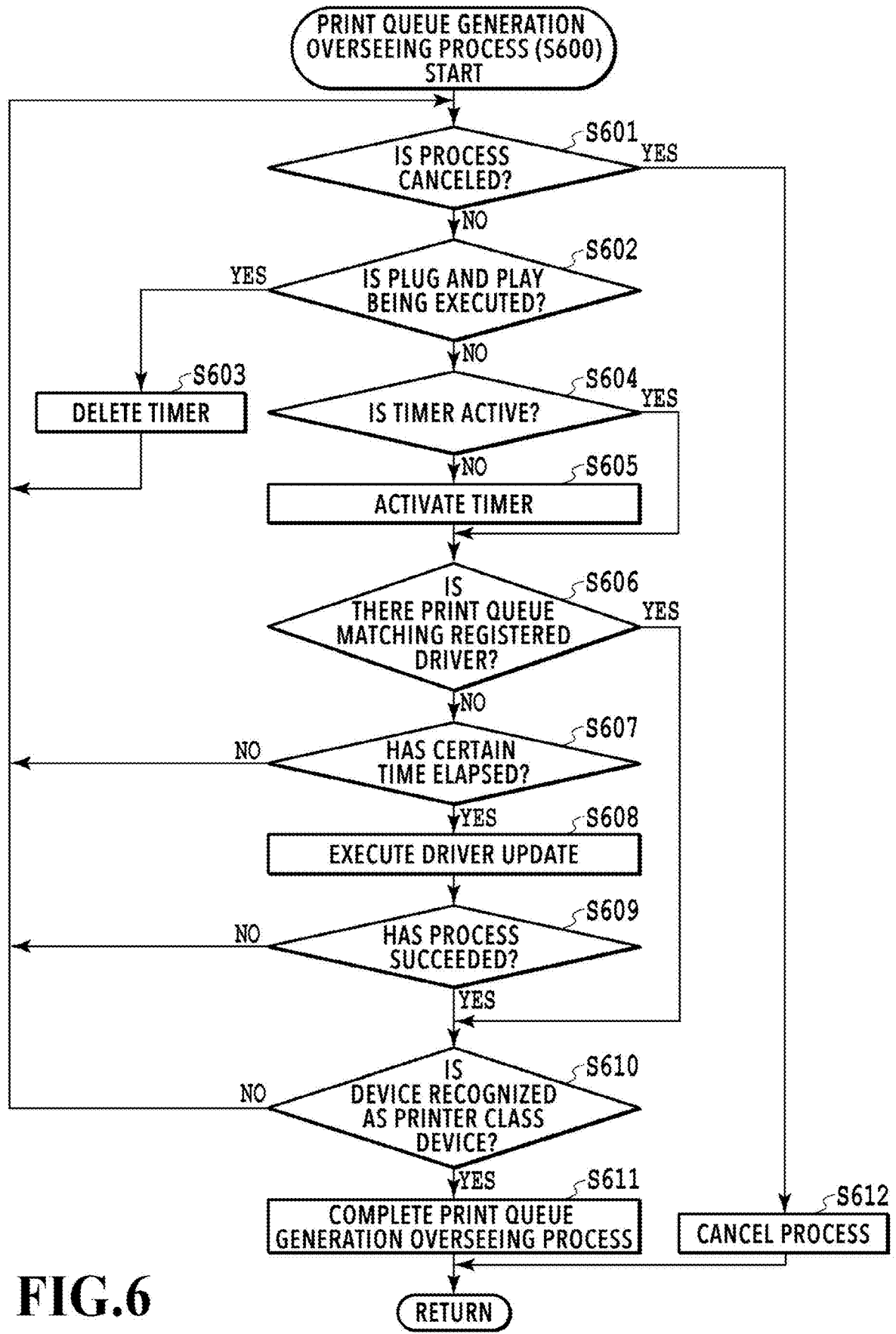
FIG. 6 is a flowchart showing a queue generation overseeing process.
Figure 7:
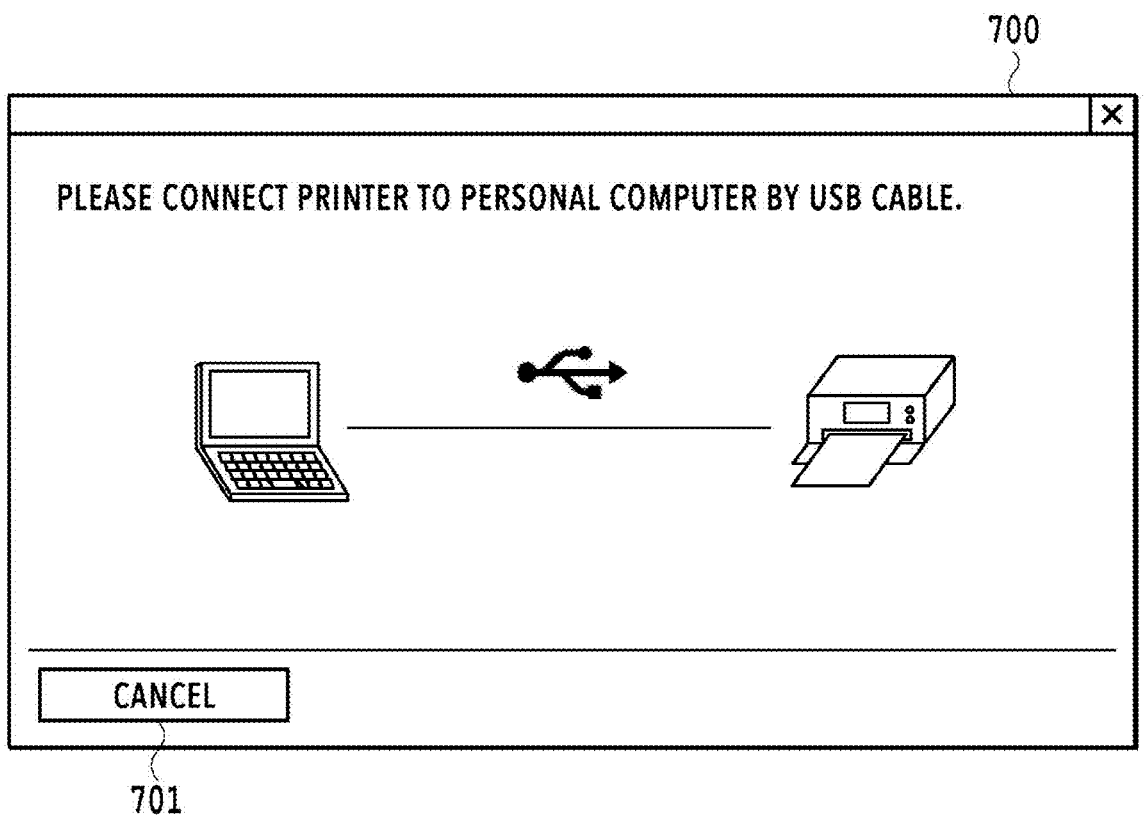
FIG. 7 is a diagram showing a screen displayed on a display unit in the USB setup process.
Figure 8:
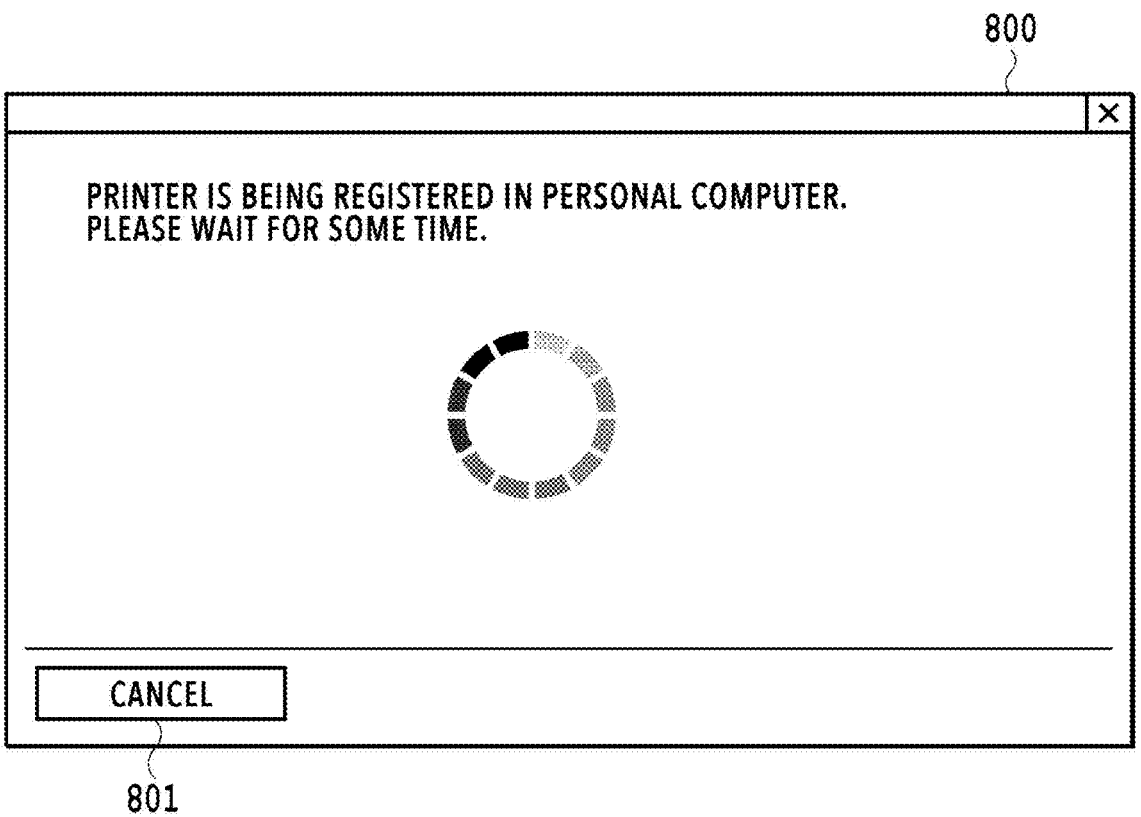
FIG. 8 is a diagram showing a screen displayed on a display unit in the USB setup process.

FIG. 6 is a flowchart showing the queue generation overseeing process carried out in S600 of FIG. 4. The queue generation overseeing process in the present embodiment will be described with reference to the flowchart of FIG. 6. Incidentally, the process of the flowchart shown in FIG. 6 is executed by the CPU 103 loading a program code of the setup program 310 into the RAM 105 and executing the program code. Alternatively, some or all of the functions of the steps in FIG. 6 may be realized by hardware such as an ASIC or electronic circuit. Incidentally, the sign "S" in the description of each process means a step in the flowchart.

If the queue generation overseeing process is started, in S601, by the action of the CPU 103, the queue generation overseeing processing unit 315 senses whether a notification to instruct cancellation of this process is made. The cancellation notification is given to the queue generation overseeing processing unit 315 in a case where the setup program 310 senses a press on the button 801 displayed on the in-process screen 800. If there is a cancellation notification, the queue generation overseeing processing unit 315 determines in S601 that the answer is YES and the process transitions to S612. In S612, by the action of the CPU 103, the queue generation overseeing processing unit 315 notifies the setup program 310, which is a caller, that the process has been canceled. After that, the queue generation overseeing process is finished.

If there is no cancellation notification in S601, the queue generation overseeing processing unit 315 determines that the answer is NO and the process transitions to S602. By the action of the CPU 103, in S602, the queue generation overseeing processing unit 315 determines whether the OS is executing PnP (PnP determination). More specifically, the queue generation overseeing processing unit 315 executes an application programming interface (API) of the OS and thereby obtains a status indicating whether the OS is executing PnP. If the OS is executing PnP, since the print queue and the device are not in a usable state, the queue generation overseeing processing unit 315 does not carry out a determination process regarding the print queue and device state until a status indicating that PnP is not being executed is obtained.

This reduces the possibility that the queue generation overseeing processing unit 315 performs a driver update process (described later) and inhibits the PnP process of the OS. More specifically, the setup program 310 of the present embodiment performs the post-insertion flow as stated above. That is, in S402, the outbox driver of the device has been registered. However, in the OS of the present embodiment, even in the post-insertion flow, the processing of replacing the inbox driver with the outbox driver by the WU occurs while the setup program 310 cannot be involved. In other words, PnP occurs multiple times in the OS. Accordingly, in a case where PnP is not executed, a processing timer is activated as will be described later. In a case where PnP is activated, the processing timer is deleted (canceled) Thus, the processing timer to be described later is a timer counted up while PnP is inactive.

If the queue generation overseeing processing unit 315 determines in S602 that the answer is YES, the process transitions to S603. In S602, if a status of PnP completion of the OS is obtained, the queue generation overseeing processing unit 315 determines that the answer is NO and the process transitions to S604. If the process transitions to S603, by the action of the CPU 103, the queue generation overseeing processing unit 315 temporarily deletes (resets) the processing timer (described later in S605) stored in the queue generation overseeing processing unit 315. The process then returns to the first step S601 of the flowchart to perform S601 again. If the process transitions from S602 to S604, by the action of the CPU 103, the queue generation overseeing processing unit 315 determines whether the processing timer (described later in S605) is already active in the queue generation overseeing processing unit 315.

Immediately after the completion of PnP, since the timer is not activated, the queue generation overseeing processing unit 315 determines in S604 that the answer is NO and the process transitions to S605. If the timer has been activated in S604, the queue generation overseeing processing unit 315 determines that the answer is YES and the process transitions to S606. If the process transitions from S604 to S605, by the action of the CPU 103, the queue generation overseeing processing unit 315 activates the processing timer. This process allows the queue generation overseeing processing unit 315 to measure and grasp a time that has elapsed from the completion of PnP. After that, the process transitions to S606.

In S606, by the action of the CPU 103, the queue generation overseeing processing unit 315 determines whether a print queue matching the driver registered in S402 of FIG. 4 is present in the information processing apparatus 101. This process is executed by the queue generation overseeing processing unit 315 calling the outbox queue detection unit 313. If the outbox queue detection unit 313 detects an outbox queue (YES), the process transitions from S606 to S610. If the outbox queue detection unit 313 does not detect an outbox queue (NO), the process transitions from S606 to S607.

If the process transitions to S607, by the action of the CPU 103, the queue generation overseeing processing unit 315 determines whether the processing timer activated in S605 has counted a certain time. That is, the queue generation overseeing processing unit 315 confirms whether a certain time has elapsed since it was determined that PnP of the OS had been completed. If the certain time has elapsed, the queue generation overseeing processing unit 315 determines in S607 that the answer is YES and the process transitions to S608. If the certain time has not elapsed, the queue generation overseeing processing unit 315 determines in S607 that the answer is NO and the process returns to S601 (redetermination).

If the answer of the determination in S606 is NO, since there is no print queue, the queue generation overseeing processing unit 315 needs to instruct the OS to update the driver. The driver update process can forcibly induce the OS to install the driver. By carrying out the driver update process, the OS generates a print queue in association with the outbox driver. However, PnP may occur multiple times depending on the version of the OS. There is a possibility that the immediate execution of the driver update process by the queue generation overseeing processing unit 315 inhibits a PnP process of the OS induced thereafter.

In other words, after the first PnP is finished and before the second PnP is executed, the PnP process of the OS may be inhibited by performing the driver update process. Accordingly, in a case where PnP is not being executed, the queue generation overseeing processing unit 315 determines in S607 whether to wait without performing the driver update process depending on whether the certain time (predetermined time) has elapsed.

In S608, by the action of the CPU 103, the queue generation overseeing processing unit 315 instructs the OS to update the driver. More specifically, the queue generation overseeing processing unit 315 issues an instruction to update the driver by the API of the OS based on the driver information obtained in S401 of FIG. 4.

Incidentally, it is preferable to execute the process of updating the driver by the API of the OS only in a case where there is no print queue to which an expected driver is allocated. This is because the API of the OS may take time to complete execution. Further, since the API of the OS has a function of forcing installation of a designated driver, the latest driver that has been already allocated may be replaced with an old driver. The queue generation overseeing processing unit 315 executes the API of the OS only in a case where the driver associated with a print queue should be updated and thereby can generate an outbox queue efficiently while avoiding downgrading of the driver. Incidentally, the driver update process by the API of the OS is effective also in a case where the OS cannot allocate the outbox driver via the WU due to PnP.

After that, by the action of the CPU 103, the queue generation overseeing processing unit 315 determines in S609 whether the API has succeeded based on a notification of a processing result from the API of the OS. If the API of the OS has succeeded, the queue generation overseeing processing unit 315 determines in S609 that the answer is YES and the process transitions to S610. On the other hand, if the API of the OS has failed, the queue generation overseeing processing unit 315 determines in S609 that the answer is NO and the process returns to S601, the first step of the flowchart (redetermination).

In S610, by the action of the CPU 103, the queue generation overseeing processing unit 315 determines whether the target device is recognized as a printer device by the information processing apparatus 101 (printer class detection). This process is executed by the queue generation overseeing processing unit 315 calling the device node detection unit 314. If the device node detection unit 314 can recognize the target device as a printer, the queue generation overseeing processing unit 315 transitions to S611. If the device node detection unit 314 does not recognize the target device as a printer, the queue generation overseeing processing unit 315 returns to S601, the first step of the flowchart.

After that, in S611, by the action of the CPU 103, the queue generation overseeing processing unit 315 notifies the setup program 310, which is a caller, that the queue generation overseeing process has been completed and finishes the queue generation overseeing process.

As described above, the setup program of the present embodiment is configured to perform processing while confirming whether PnP is being executed based on the premise that there is an OS in which PnP may occur multiple times. This makes it possible to update and install the driver appropriately and prevent a user from mistakenly trying to use the device during the installation.

As a result, a user can use the USB device more reliably and easily. In addition, the present embodiment can reduce the possibility of updating the driver during the PnP process of the OS. Accordingly, in a setup of the USB device, the possibility that the setup program causes an invalid operation of the OS can be reduced. As described above, according to the present embodiment, an information processing apparatus, control method, and storage medium capable of suppressing a decrease in user convenience can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098737, filed Jun. 20, 2022, which is hereby incorporated by reference wherein in its entirety.

What is claimed is:

1. A non-transitory computer-readable storage medium storing one or more programs configured to set up by installing a driver of a target device onto an information processing apparatus and configured to cause one or more computers to function as:

an obtaining unit configured to obtain information as to whether plug and play of an operating system is being executed; and a processing unit configured to perform a specific process to update the driver applied to the target device to a first type of driver in a case where an obtainment result in the obtaining unit indicates that the plug and play is not being executed and a queue in which the first type of driver corresponding to the target device is set is not present in the information processing apparatus.

2. The non-transitory computer-readable storage medium according to claim 1, wherein the processing unit does not perform the specific process in a case where the queue in which the first type of driver corresponding to the target device is set is present.

3. The non-transitory computer-readable storage medium according to claim 1, wherein the obtaining by the obtaining unit and the specific process performed by the processing unit are performed in response to detection of connection of the target device corresponding to the first type of driver.

4. The non-transitory computer-readable storage medium according to claim 1, wherein the first type of driver is an outbox driver.

5. The non-transitory computer-readable storage medium according to claim 1, wherein, the obtaining unit obtains, by using an application programming interface of the operating system, a status indicating whether the plug and play is being executed.

6. The non-transitory computer-readable storage medium according to claim 1, wherein the specific process is a process of instructing the operating system to update the driver to the first type of driver by using an application programming interface of the operating system.

7. The non-transitory computer-readable storage medium according to claim 1, wherein the one or more computers are further caused to function as:

a determination unit configured to determine whether the queue in which the first type of driver corresponding to the target device is set is present in the information processing apparatus, wherein the processing unit performs the specific process in a case where the determination unit determines that the queue in which the first type of driver corresponding to the target device is set is not present.

8. The non-transitory computer-readable storage medium according to claim 7, wherein, the determination unit obtains a list of queues which have been installed on the information processing apparatus and determines whether the queue in which the first type of driver corresponding to the target device is set is present by determining, for each of the queues, whether a type of driver associated with the queue is the first type of driver.

9. The non-transitory computer-readable storage medium according to claim 1, wherein the processing unit performs the specific process in a case where a predetermined time has elapsed since the obtainment result in the obtaining unit indicating that the plug and play is not being executed in a case where the queue in which the first type of driver corresponding to the target device is set is not present.

10. The non-transitory computer-readable storage medium according to claim 1, wherein the one or more computers are further caused to function as:

a determination unit configured to determine whether the target device is recognized as a printer after a notification indicating that a process of updating the driver to the first type of driver has succeeded is obtained as a response to the specific process; and a control unit configured to perform control to perform the obtaining by the obtaining unit and the specific process performed by the processing unit again in a case where the determination unit determines that the target device is not recognized as the printer.

11. The non-transitory computer-readable storage medium according to claim 10, wherein the determination unit determines whether the target device is recognized as the printer in a case where the queue in which the first type of drive corresponding to the target device is set is present and the specific process is not performed; and the control unit performs control to perform the obtaining by the obtaining unit and the specific process performed by the processing unit in a case where the determination unit determines that the target device is not recognized as the printer in a case where the queue in which the first type of driver corresponding to the target device is set is present and the specific process is not performed.

12. The non-transitory computer-readable storage medium according to claim 10, wherein the determination unit obtains a device class of the printer and determines that the target device is recognized as the printer in a case where information on any of devices allocated to the device class of the printer matches a device descriptor obtained from the target device.

13. The non-transitory computer-readable storage medium according to claim 10, wherein the control unit performs control to notify a user of a notification content corresponding to success of a setup of the target device in a case where the determination unit determines that the target device is recognized as the printer.

14. The non-transitory computer-readable storage medium according to claim 1, wherein the target device is a printer.

15. The non-transitory computer-readable storage medium according to claim 1, wherein the obtaining unit obtains information as to whether the plug and play is being executed in a case where the target device is connected to the information processing apparatus via a USB.

16. An information processing apparatus in which a program configured to set up by installing a driver of a target device onto the information processing apparatus runs, the information processing apparatus comprising:

at least one memory; and at least one processor which function as:

an obtaining unit configured to obtain information as to whether plug and play of an operating system is being executed; and a processing unit configured to perform a specific process to update the driver applied to the target device to a first type of driver in a case where an obtainment result in the obtaining unit indicates that the plug and play is not being executed and a queue in which the first type of driver corresponding to the target device is set is not present in the information processing apparatus.

17. A control method for controlling an information processing apparatus to install a driver of a target device onto the information processing apparatus, the control method comprising:

obtaining information as to whether plug and play of an operating system is being executed; and performing a specific process to update the driver applied to the target device to a first type of driver in a case where an obtainment result in the obtaining indicates that the plug and play is not being executed and a queue in which the first type of driver corresponding to the target device is set is not present in the information processing apparatus.

\* \* \* \* \*